United States Patent [19]

Novotny et al.

[11] Patent Number: 4,784,572
[45] Date of Patent: Nov. 15, 1988

[54] CIRCUMFERENTIALLY BONDED ROTOR

[75] Inventors: Rudolph J. Novotny, Stuart; Larry D. Hamner, Palm Beach Gardens, both of Fla.

[73] Assignee: United Technologies Corporation, Hartford, Conn.

[21] Appl. No.: 108,171

[22] Filed: Oct. 14, 1987

[51] Int. Cl.⁴ .............................................. F01D 5/34
[52] U.S. Cl. ............................ 416/213 R; 416/244 A; 416/198 A
[58] Field of Search ....................... 416/213 R, 244 A; 419/198 A

[56] References Cited

U.S. PATENT DOCUMENTS

| 874,398 | 12/1907 | De Ferranti | 416/213 R |
| 905,487 | 12/1908 | Worsey | 416/244 A |
| 2,773,169 | 12/1956 | Lees | 416/213 R X |
| 2,922,619 | 1/1960 | Slemmons | 416/213 R X |
| 2,995,338 | 8/1961 | Clarke et al. | 416/213 R |
| 3,249,293 | 5/1966 | Koff | 416/244 A X |
| 3,588,276 | 6/1971 | Jubb | 416/213 R X |
| 3,658,439 | 4/1972 | Kydd | 416/213 R X |
| 3,905,723 | 9/1975 | Torti | 416/213 R X |
| 4,152,816 | 5/1979 | Ewing et al. | 416/213 R X |
| 4,273,512 | 6/1981 | Weiler | 416/213 R X |
| 4,483,054 | 11/1984 | Ledwith | 416/198 A X |

FOREIGN PATENT DOCUMENTS

| 139298 | 11/1934 | Austria | 416/213 |
| 675222 | 5/1939 | Fed. Rep. of Germany | 46/804 |
| 885851 | 8/1953 | Fed. Rep. of Germany | 416/213 R |
| 1551187 | 4/1970 | Fed. Rep. of Germany | 416/213 |

Primary Examiner—Everette A. Powell, Jr.
Attorney, Agent, or Firm—Edward L. Kochey, Jr.

[57] ABSTRACT

A rotor has an inner disk member including a web and a circumferential widened outer portion. A blade member has a continuous circumferential inner edge. At least one of the members has a plurality of axially spaced circumferential rings extending toward the other member. The two members are diffusion bonded together. A stiff lightweight assembly is achieved.

6 Claims, 2 Drawing Sheets

CIRCUMFERENTIALLY BONDED ROTOR

TECHNICAL FIELD

The invention relates to bladed rotors and in particular to bonded rotors for high rotational speed application.

BACKGROUND OF THE INVENTION

Compressor and turbine rotors are formed of one or more disks, each carrying a plurality of blades. The disk structure must resist bending caused by the blades and vibration of the blades. Of particular importance in high speed applications is the strength of the disk structure which must resist the centrifugal forces of the blades, the blade attachments, and the disk itself. Only structure providing full hoop path is live load which resists the centrifugal force. Lapped construction where one of the members is not a full hoop creates dead load which increases a load but does not contribute to the strength. The thickness of the disk material remote from the rotational center line is detrimental since it has higher force per unit mass and also has a higher mass because of its greater diameter.

The disk is usually wide at its outer rim to match the blade width and to appropriately resist bending forces transmitted by the blade. Conventional drum rotors have single neck blade attachments. These must be thickened beyond stress limited thickness to withstand blade vibrations.

The use of bonded attachments allows for multi-rings which can withstand vibrations at or near stress limited thicknesses. Since blades of compressors or gas turbines will experience higher temperature than the disk, it is helpful to use a construction which permits different materials for disk and blades, including blade platforms. It is also helpful to have a structure which is easily machined, not only reducing the cost but improving the quality of the product.

SUMMARY OF THE INVENTION

A central disk member has a radially extending web and an outer portion which is wider than the web. A circumferentially surrounding blade member includes a continuous circumferential inner edge and a plurity of integral outwardly extending blades secured thereto. At least one of the members has a plurality of axially spaced radially extending rings throughout the entire circumference. The axial extent of this plurality of rings substantially exceeds the width of the web. The two members are compressively fit together with the rings extending between the two thereby providing good contact, and are thereafter abuttingly bonded by diffusion bonding.

DESCRIPTION OF THE PREFERRED EMBODIMENT

Figure 1:
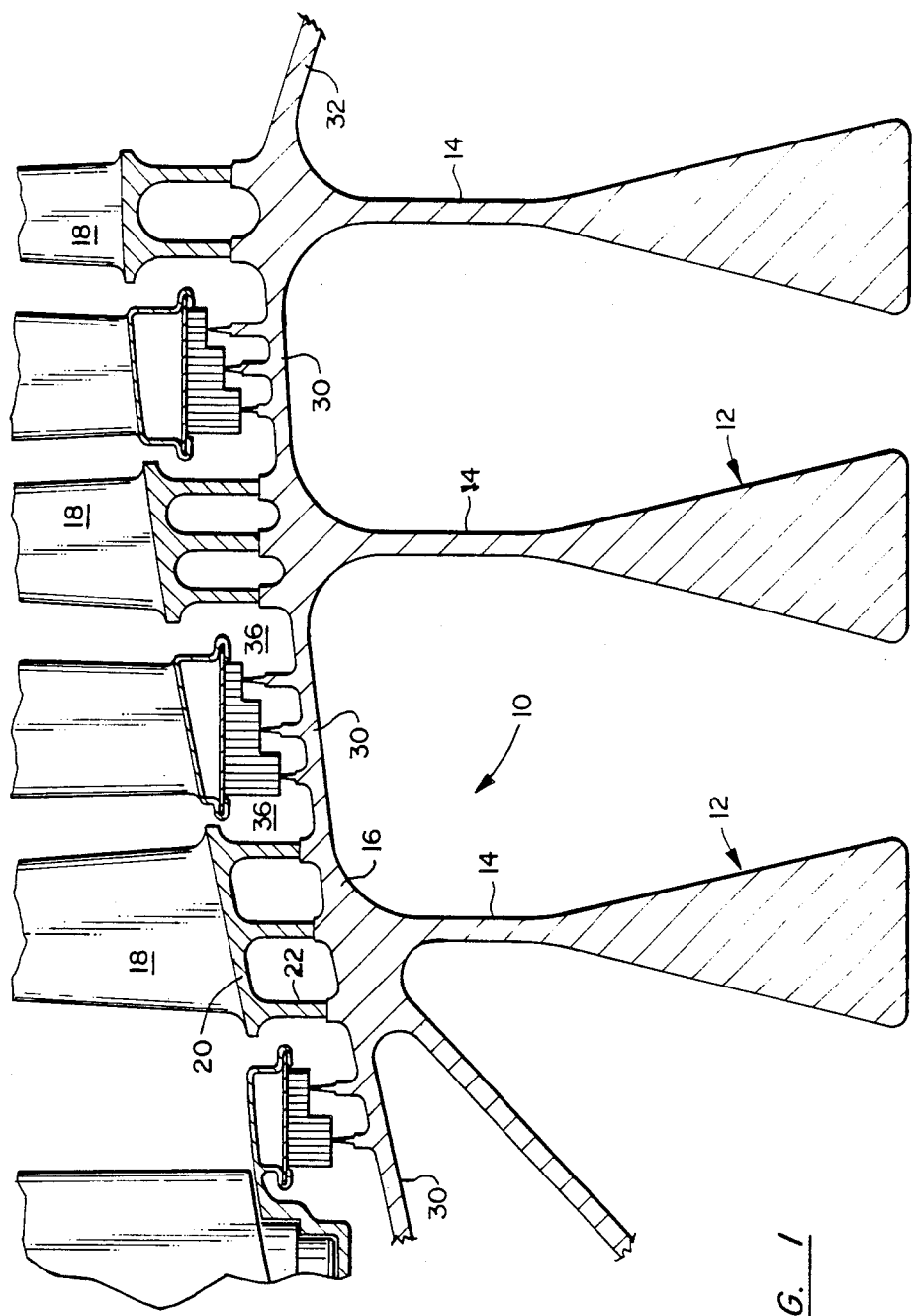
FIG. 1 is a section through a rotor assembly.
Figure 2:
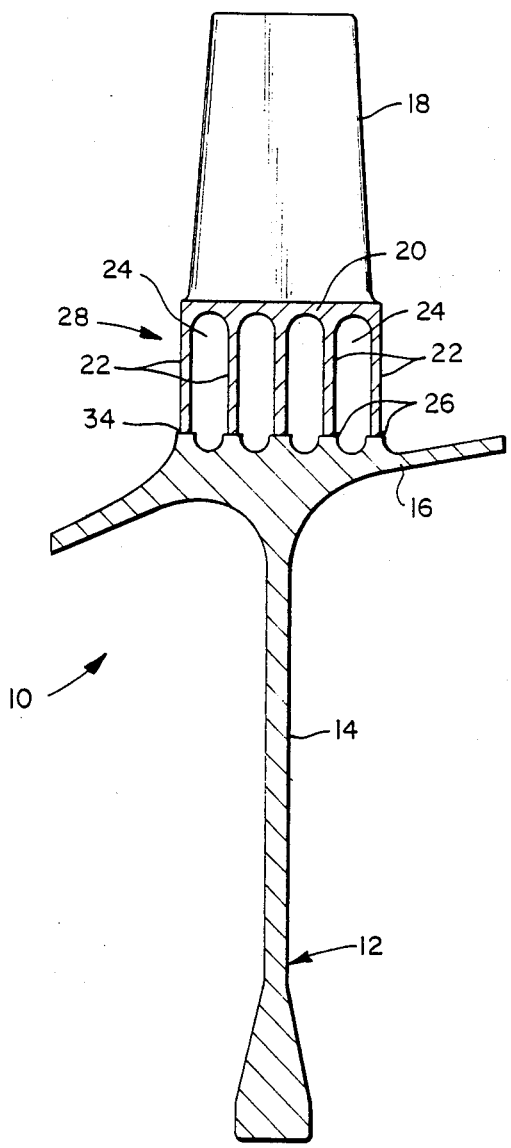
FIG. 2 is a detail of the rotor construction.

FIG. 1 shows a rotor assembly including a plurality of disk assemblies 10. Each is formed of a disk member 12 and a blade member 28. Disk member 12 contains a radially extending web 14 and an outer portion 16 with this portion being wider than the web.

A plurality of blades 18 are secured to a continuous circumferential outer rim 20, these units being joined to form an integral member which is blade member 28.

This blade member also contains a plurality of axially spaced rings 22 which extend radially inward. The rings may be conveniently formed by forging or casting with or without simple circumferential machining of grooves 24 on a lathe. The outer portion 16 of the disk 12 also preferebly has a plurality of plateaus 26 located with the same spacing as the rings.

The blade member 28 may be heated and placed in shrink fit relationship over the disk member 12. This inherently provides for rounding of any out of roundness of the blade member and uniform contact between the two members. The blade member is then diffusion bonded to the disk member or otherwise solidly joined.

Alternatively they may be initially constrained in a low expansion fixture. Both the disk member and the blade member are concentrically placed inside a temporary third member having a low coefficient of expansion. Heating the assembly compresses the members to be joined. They are diffusion bonded while in this state.

The blades 18 produce an axial translation force on the structure and also a rotating or bending moment. The plurality of rings all share in resisting the translation force in the manner of a beam with both ends fixed. Primarily the outer members function to resist the bending or rotation of the blade with one side acting in compression and the other in tension. It can be seen that this grid like structure provides good stiffness to resist the required forces without having the massive weight of the conventional solid rim blade platforms. The total thickness of all the rings approaches the stress only limited single neck thickness. Spacing of the rings provides a substantial moment arm for restraint of vibration. The metal area of the rings is less than half of the total width with the bulk of the structure being air. Accordingly, excessive metal mass which contributes to high forces is avoided. This not only reduces the material required at the ring location, but in lightening the structure also permits a reduction in the size of the inner portion of the disk 12.

The outer portions 16 function as rim spacers 30 in being welded together to form a rotor drum. Axial load is transmitted through these spacers, ultimately to the bearing location.

There is a widening of the disk inboard of the rings at the outer portion 16, but this is at a lesser diameter than conventional structures. Therefore, the rim spacers 30 which are welded to the rim spacers of adjacent disks are also of lesser diameter. This also reduces the rotational mass. Furthermore, since these rim spacers are all closer to the centerline, the last rim spacer 32 is also closer to the centerline and reduces the cone angle to the bearing compartment, as compared to those which are located closer to the blade platform.

The diffusion bonding location 34 is preferably located close to the disk portion although depending on various manufacturing methods it may be located anywhere along the rings. The blade material may be different than the disk material to better optimize the rotor weight and durability characteristics. For instance, high temperature titanium blades and rim may be used with a more ductile disk.

Volume 36 is a parasitic air volume chamber which consumes power thereby decreasing compressor efficiency. The use of the plurality of spaced rings as compared to the conventional narrow neck minimizes this volume thereby optimizing aerodynamic performance.

This structure provides a very light but also very stiff disk rim and provides a construction of simple manufacture. The reduced weight at the outer periphery has a cascade effect in reducing the mass required throughout the rest of the disk as well as the inner stage construction. This accordingly provides a 23 percent weight reduction compared to a stress optimized integrally bladed rotor.

We claim:

1. A circumferentially bonded rotor comprising:
   a disk member having a radially extending web, and an outer portion wider than said web;
   a blade member including a continuous circumferential inner edge and a plurality of integral outwardly extending blades;
   at least one of said members having a plurality of axially spaced circumferential radially extending rings, the axial extent of said plurality of rings substantially exceeding the width of said web; and
   said blade member surrounding said disk member and said rings extending toward and abuttingly diffusion bonded to the other member.

2. A circumferentially bonded rotor as in claim 1: said rings being integrally formed with said blade member.

3. A circumferentially bonded rotor as in claim 1: said blade member being a shrink fit on said disk member and also bonded to said disk member.

4. A circumferentially bonded rotor as in claim 1: said disk member having integral rim spacers axially extending toward and joining with rim spacers of an adjacent disk member.

5. A circumferentially bonded rotor as in claim 1: the total width of all of said rings being less than one-half the axial extent of said plurality of rings.

6. A circumferentially bonded rotor as in claim 1: the number of rings being greater than two.

* * * * *